(12) United States Patent
Goodman et al.

(10) Patent No.: US 8,270,150 B2
(45) Date of Patent: Sep. 18, 2012

(54) EXTERNALLY LATCHING DRIVE TRAY AND DRIVE REMOVAL MECHANISM

(75) Inventors: Walter A. Goodman, Research Triangle Park, NC (US); Daniel P. Kelaher, Research Triangle Park, NC (US); Roland K. Alo, Research Triangle Park, NC (US); William Beauchamp, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 12/841,461

(22) Filed: Jul. 22, 2010

(65) Prior Publication Data

US 2012/0002364 A1   Jan. 5, 2012

Related U.S. Application Data

(63) Continuation-in-part of application No. 12/827,897, filed on Jun. 30, 2010, now abandoned.

(51) Int. Cl.
   *G06F 1/16* (2006.01)
(52) U.S. Cl. ............... 361/679.33; 385/135; 33/701; 174/120 R
(58) Field of Classification Search ............ 385/136, 385/112, 110, 101, 111, 100, 135; 355/55; 307/102, 103; 358/305, 304; 361/679.33, 361/679.37, 679.46, 679.31, 679.54, 679.52, 361/679.39, 679.22, 679.4, 679.38; 33/527, 33/228, 576, 756, 701; 376/202, 190; 174/24, 174/107, 110 PM, 120 R, 68.1, 50, 75 C
See application file for complete search history.

(56) References Cited

U.S. PATENT DOCUMENTS

| | | | |
|---|---|---|---|
| 6,683,390 B2 * | 1/2004 | Miura | 307/10.2 |
| 2003/0043550 A1 | 3/2003 | Ives | |
| 2006/0262355 A1 * | 11/2006 | Kurata et al. | 358/305 |
| 2007/0029902 A1 | 2/2007 | Selvidge et al. | |
| 2008/0130216 A1 | 6/2008 | Tsai et al. | |
| 2009/0279244 A1 | 11/2009 | Crippen et al. | |

FOREIGN PATENT DOCUMENTS

GB          2330447         6/2002

* cited by examiner

*Primary Examiner* — Hung Duong
(74) *Attorney, Agent, or Firm* — Suiter Swantz pc llo

(57) ABSTRACT

A drive-removal mechanism may include, but is not limited to: at least one rotatable member; and at least one drive-engaging member operably coupled to the at least one rotatable member, wherein the drive-removal mechanism is detached from at least one drive to be removed. A drive enclosure may include, but is not limited to: at least one drive-receiving member including at least one drive-receiving channel; and at least one drive-removal mechanism including: at least one rotatable member; and at least one drive-engaging member operably coupled to the at least one rotatable member, wherein the drive-removal mechanism is configured to at least partially remove at least one hot swappable drive from the at least one drive-receiving channel.

23 Claims, 11 Drawing Sheets

EXTERNALLY LATCHING DRIVE TRAY AND DRIVE REMOVAL MECHANISM

RELATED APPLICATIONS

The present application constitutes a continuation-in-part of U.S. patent application Ser. No. 12/827,897, entitled EXTERNALLY LATCHING DRIVE TRAY AND DRIVE REMOVAL MECHANISM, naming Walter A. Goodman, Daniel P. Kelaher, Roland K. Alo and William Beauchamp as inventors, filed Jun. 30, 2010, which is currently co-pending, or is an application of which a currently co-pending application is entitled to the benefit of the filing date.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

BACKGROUND

Redundant hard drives that may be swapped while a storage system is running are a critical feature for high-availability systems. As new technologies come into these systems, and as system density becomes more critical, smaller features that are just as robust as previous generations must be developed to protect the customer data. These smaller features may render existing drive removal technologies unfeasible.

SUMMARY

A drive-removal mechanism may include, but is not limited to: at least one rotatable member; and at least one drive-engaging member operably coupled to the at least one rotatable member, wherein the drive-removal mechanism is detached from at least one drive to be removed.

A drive enclosure may include, but is not limited to: at least one drive-receiving member including at least one drive-receiving channel; and at least one drive-removal mechanism including: at least one rotatable member; and at least one drive-engaging member operably coupled to the at least one rotatable member, wherein the drive-removal mechanism is configured to at least partially remove at least one hot swappable drive from the at least one drive-receiving channel.

A method for removing a hot swappable drive from a drive enclosure may include, but is not limited to: receiving an applied force to rotate at least one rotatable member about a coupling with at least one drive-engaging member; receiving an applied force to move the at least one drive-engaging member in a direction substantially parallel to the primary axis of the at least one drive-engaging member; and applying a force to at least a portion of at least one hot swappable drive with the at least one drive-engaging member.

Such devices and methods may allow customers and servicers to remove drives from a drive enclosure while the system is still running without removing adjacent drives while maximizing the density of drives within the system.

DETAILED DESCRIPTION

Figure 1:
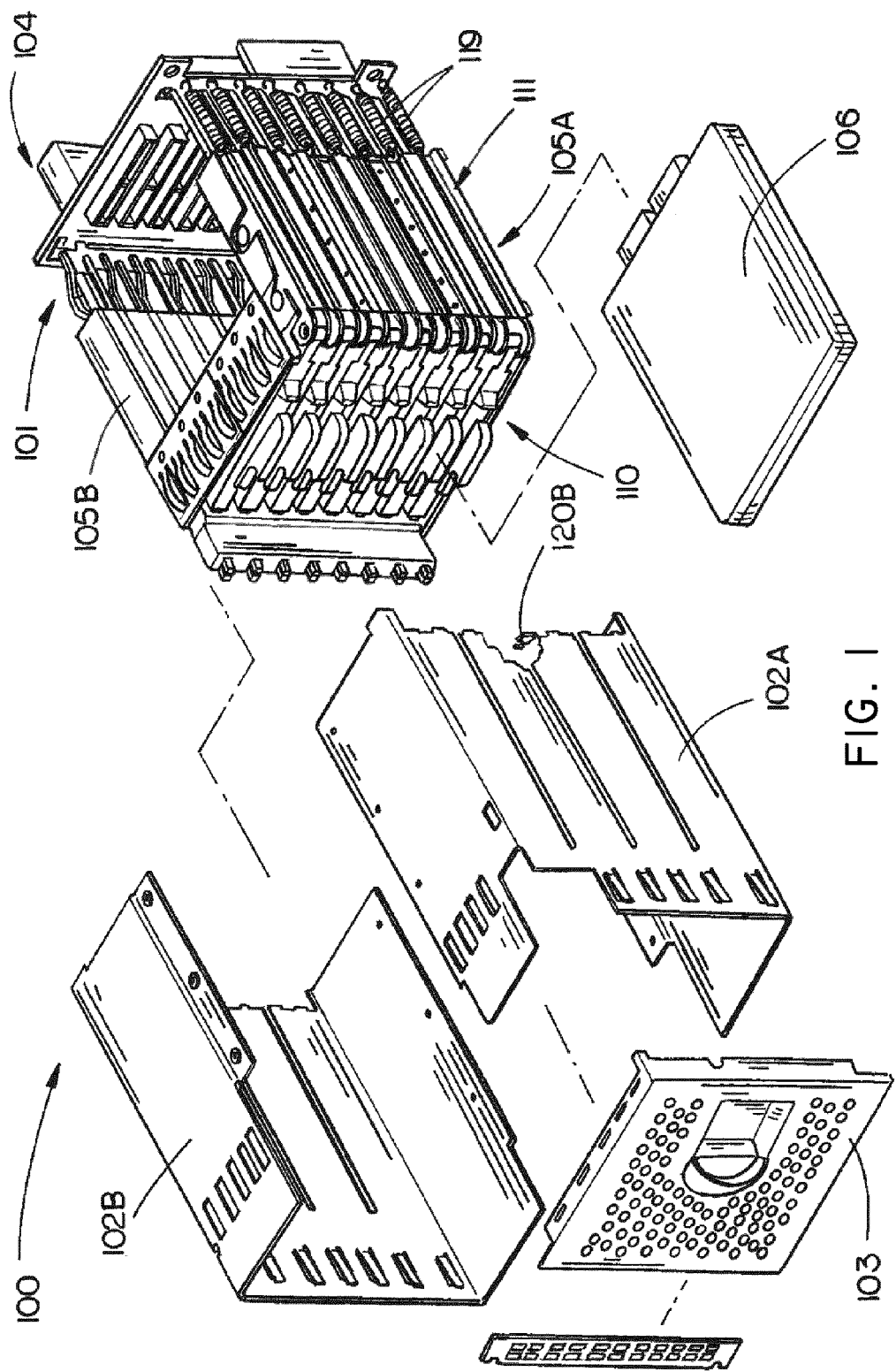
FIG. 1 depicts an exploded perspective view of a drive enclosure.
Figure 2:
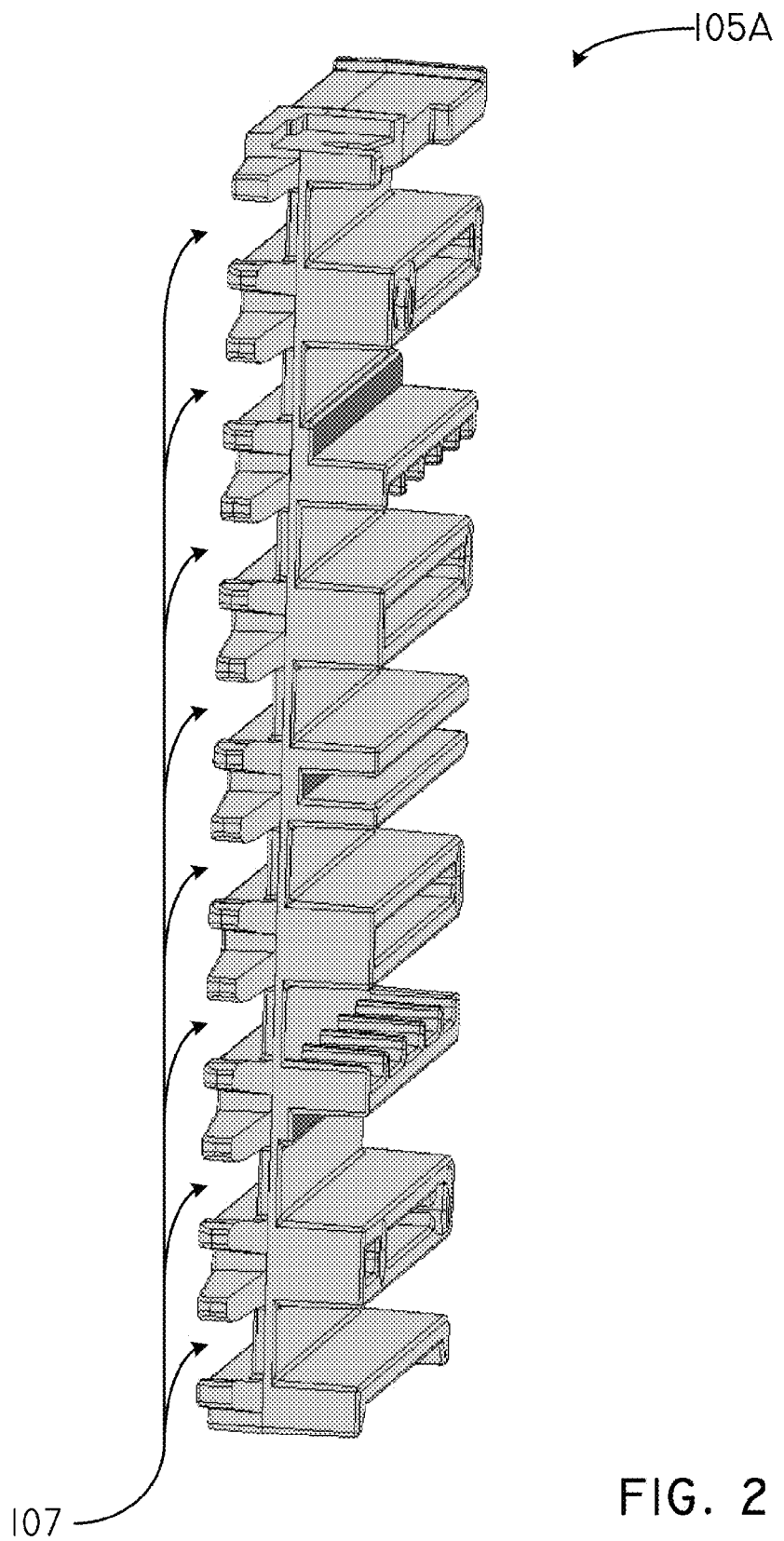
FIG. 2 depicts a perspective view of a drive-receiving member.
Figure 3:
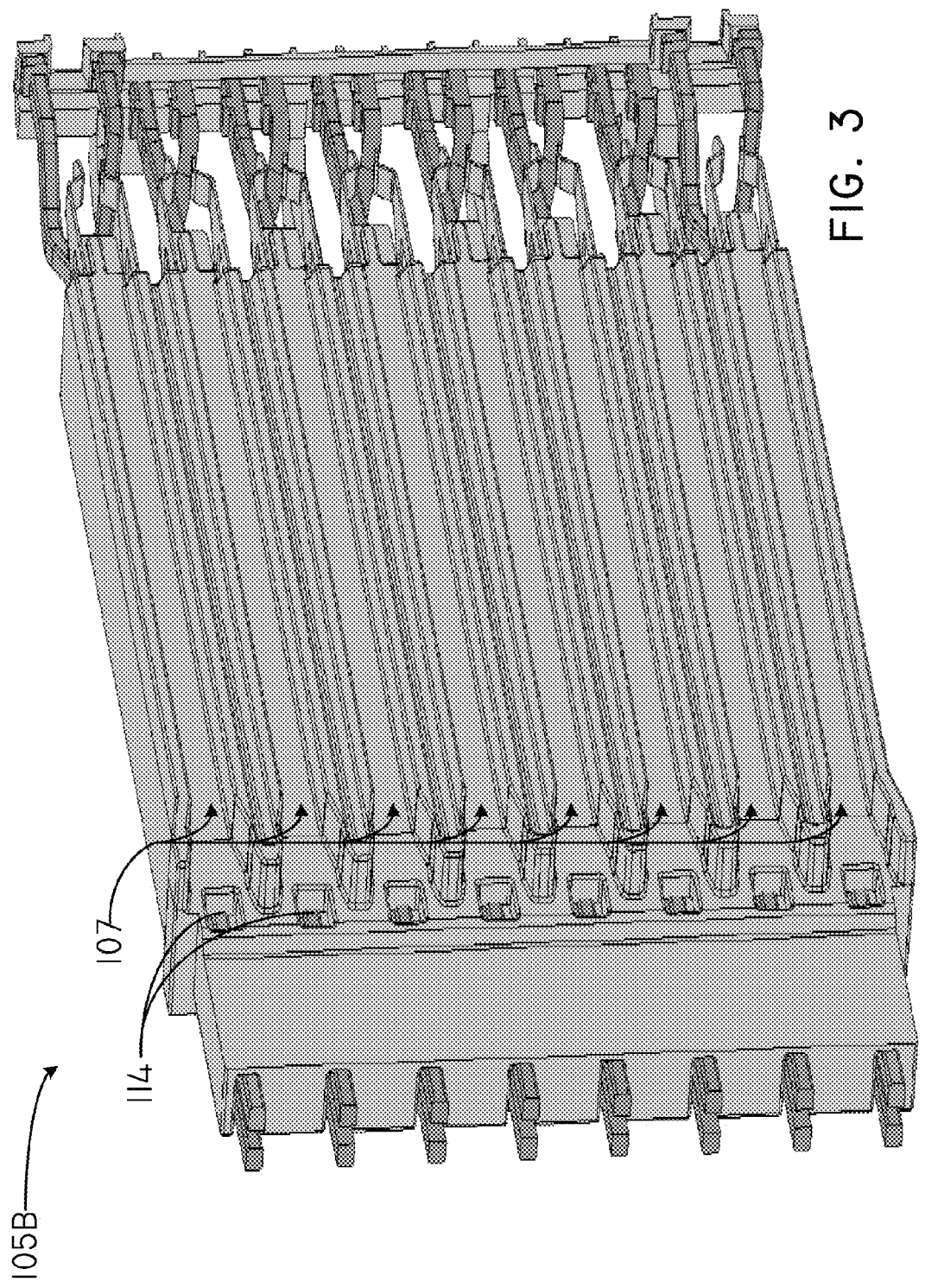
FIG. 3 depicts a perspective view of a drive-receiving member.
Figure 4:
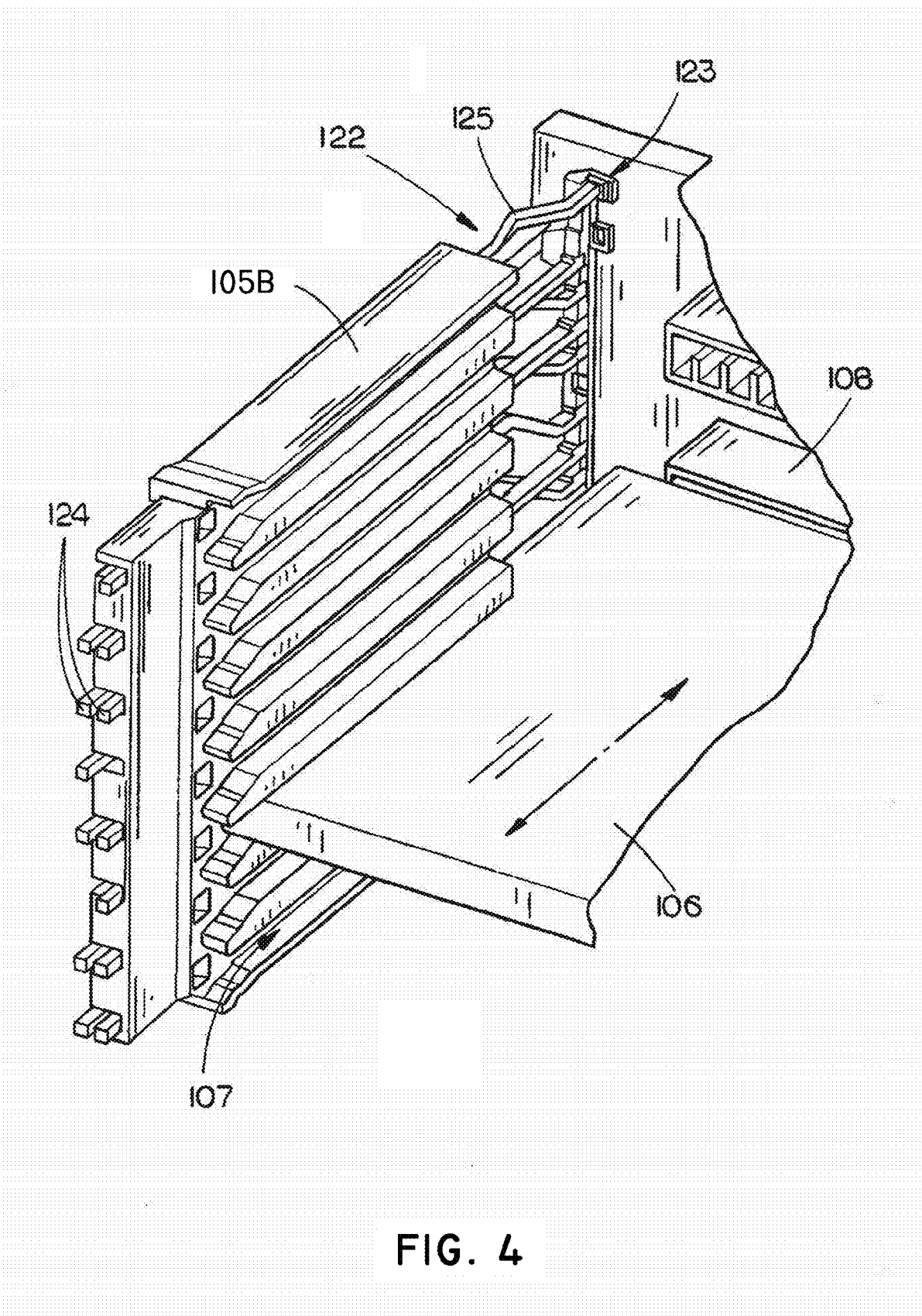
FIG. 4 depicts a perspective view of a drive-receiving member receiving a hot swappable drive.
Figure 5:
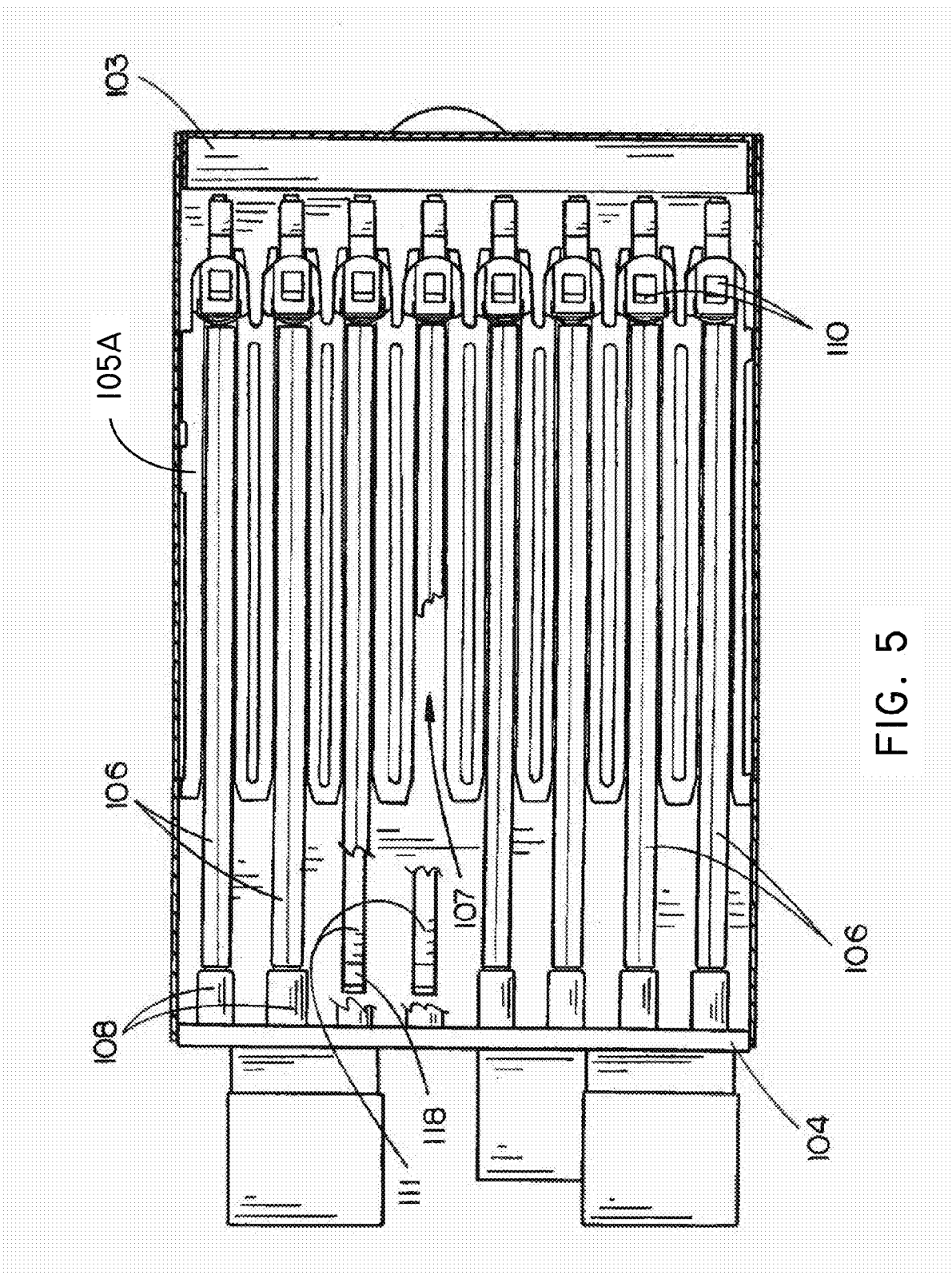
FIG. 5 depicts a cross-sectional view of drive-receiving members receiving multiple hot swappable drives.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Recent hard disk drive form factors include 1.8" drives. These drives may include solid-state (e.g. flash) drives as there may be limited space for internal mechanics of a spinning drive within 1.8" drives. Such drives may also lack sufficient space to attach a drive tray to them to allow them to be hot swappable into and out of a multi-drive enclosure. Therefore, an alternative design may be needed to allow customers and servicers to remove drives from a drive enclosure while the system is still running without removing adjacent drives while maximizing the density of drives within the system.

FIGS. 1-11 illustrate various views of a multi-drive enclosure 100 and its components. Referring to FIG. 1, the drive enclosure 100 may include a drive bay 101 formed by at least one drive cage bracket portion 102 (e.g. drive cage bracket portion 102A and drive cage bracket portion 102B), a drive enclosure door 103, and a circuit board backplane 104.

The backplane 104 may include at least one port 108 configured to receive electrical interconnects of the hot swappable drive 106 when the hot swappable drive 106 is disposed within the drive-receiving member 105. The port 108 may be configured to transmit electrical signals from output ports of the hot swappable drive 106 to circuitry of the backplane 104. The signals may include signals associated with read/write operations for various types of memory storage devices (e.g. flash memory).

Referring to FIGS. 1-5, the drive enclosure 100 may further include at least one drive-receiving member 105 (e.g. drive-receiving member 105A and drive-receiving member 105B). A drive drive-receiving member 105 may be configured to receive a hot swappable drive 106 (e.g. a 1.8" flash drive). For example, a drive-receiving member 105 may include at least one drive-receiving channel 107. A drive-receiving channel 107 may be configured to receive a portion of a hot swappable drive 106 within the drive-receiving channel 107 thereby limiting vertical movement of the hot swappable drive 106 within the drive bay 101. A drive-receiving channel 107 may include a tapered portion to facilitate insertion of a hot swappable drive 106 into the drive-receiving channel 107. Upon insertion, the hot swappable drive 106 may be coupled with the port 108.

Referring to FIGS. 1 and 6-9, the drive enclosure 100 may include at least one drive-removal mechanism 109. As described above, the hot swappable drive 106 may be sized such that the hot swappable drive 106 may incapable of being mounted within a chassis including a drive-removal mechanism. As such, the drive-removal mechanism 109 may be detached from the hot swappable drive 106 and, instead, may be integrated as a component within the drive enclosure 100 itself.

The drive-removal mechanism 109 may include at least one rotatable member 110 and at least one drive-engaging member 111 configured to physically engage a hot swappable drive 106 in order to alter the position of the hot swappable drive 106 within the drive enclosure 100.

Figure 6:
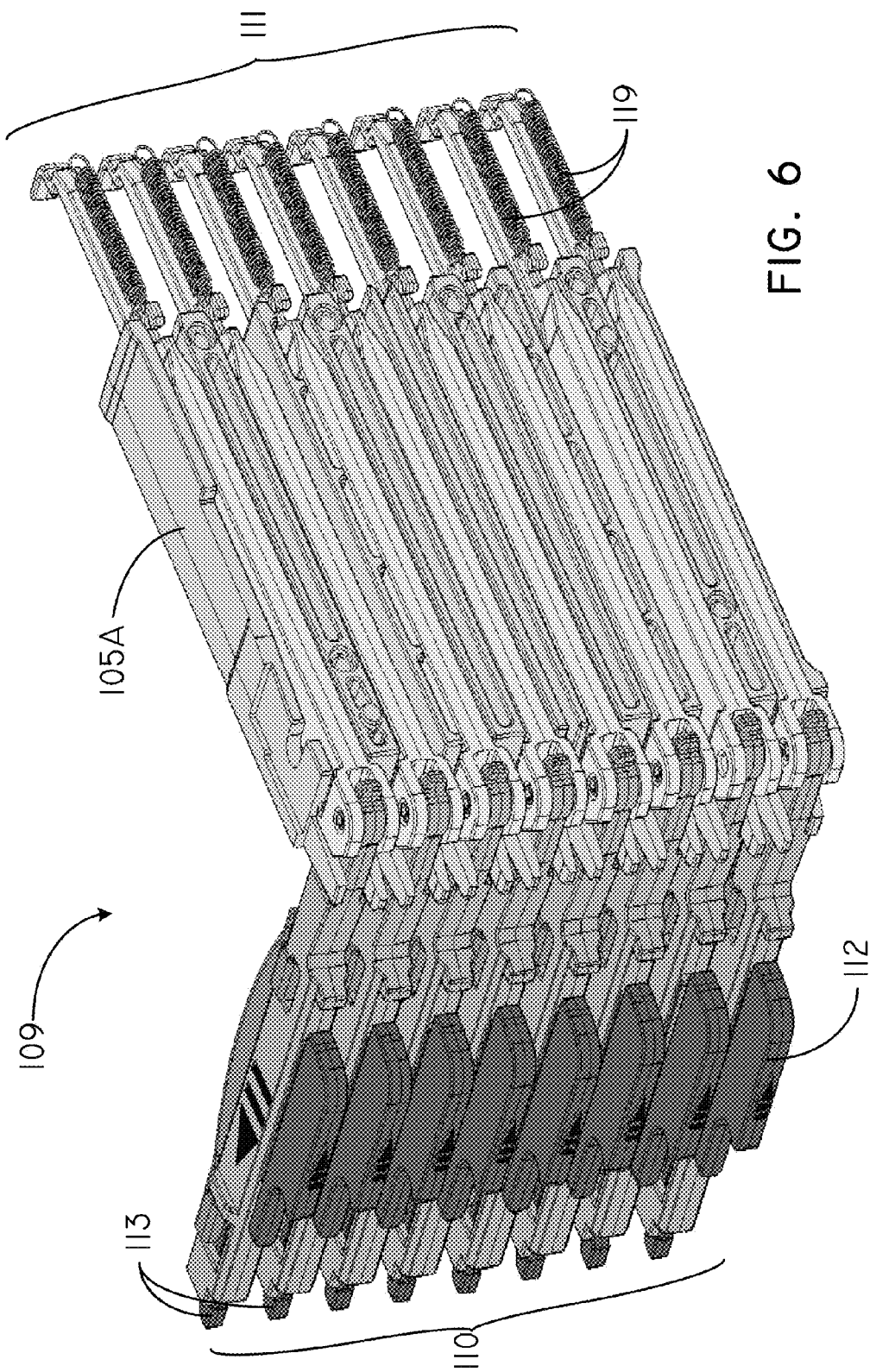
FIG. 6 depicts a perspective view of a drive-receiving member and a drive-removal mechanism.

A rotatable member 110 may include a locking mechanism 112. The locking mechanism 112 may include a projection 113 configured to be inserted into a locking aperture 114 of the drive-receiving member 105B thereby affixing the rotatable member 110 in a position substantially perpendicular to the drive-engaging member 111. When in such a position, the rotatable member 110 may secure a hot swappable drive 106 within the drive-receiving channel 107 thereby limiting movement of the hot swappable drive 106 within the drive-receiving channel 107 and maintaining contact of the electrical interconnects of the hot swappable drive 106 within the corresponding port 108. As shown in FIG. 6, the locking mechanism 112 may be disengaged by moving the locking mechanism 112 laterally to remove the projection 113 from the locking aperture 114 thereby permitting rotation of the rotatable member 110.

Figure 7:
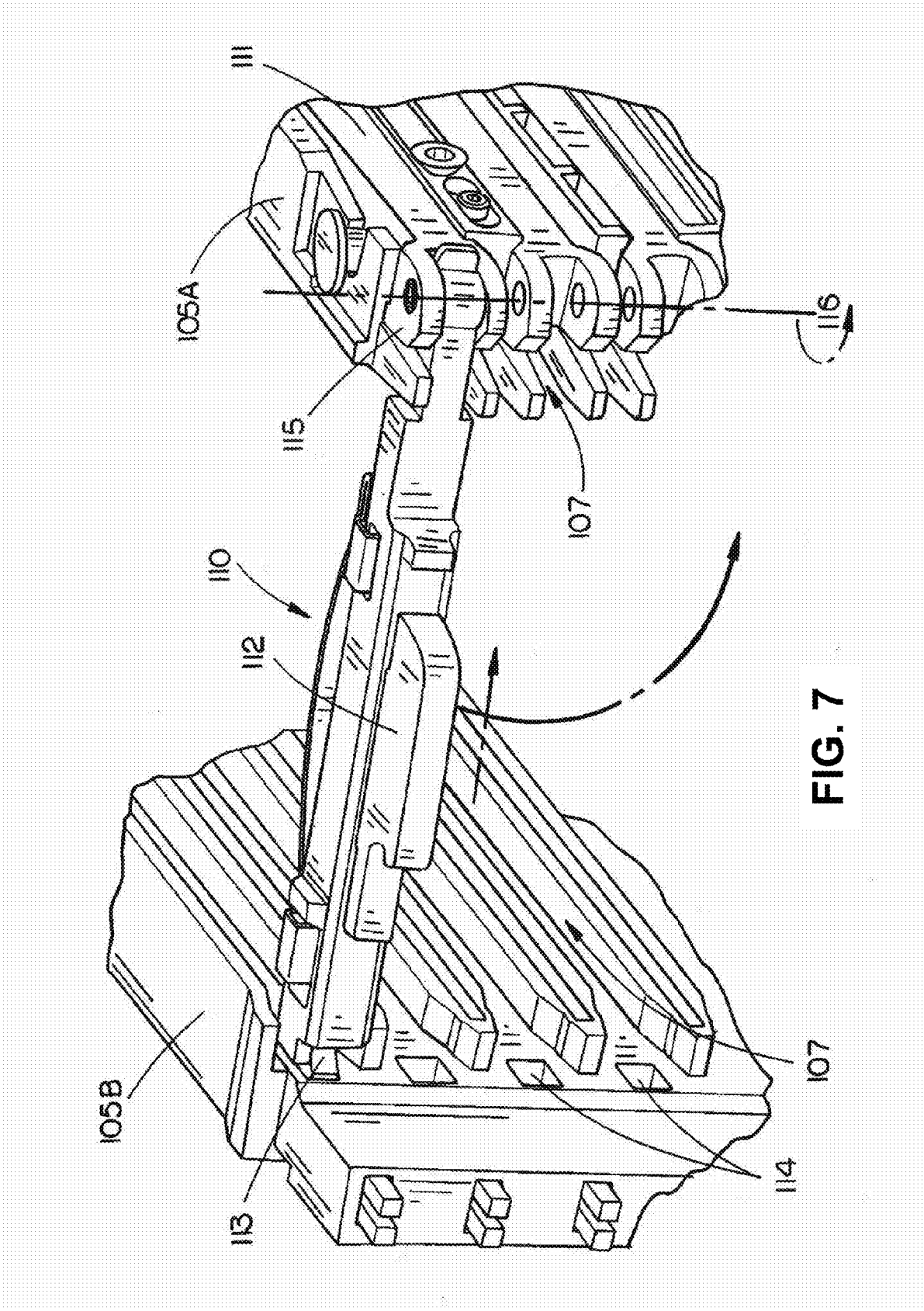
FIG. 7 depicts a perspective view of a drive-receiving members and a drive-removal mechanism.
Figure 8:
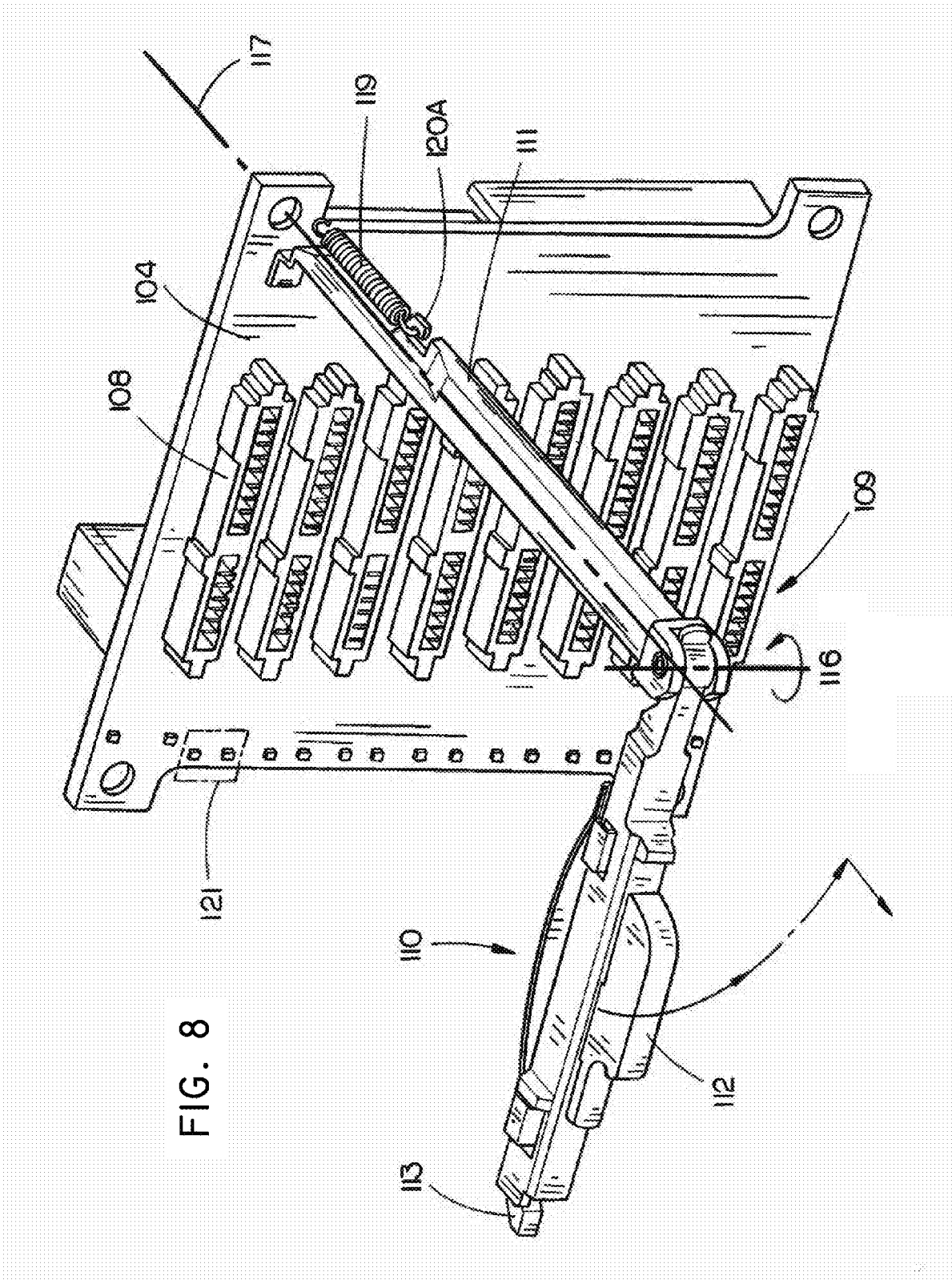
FIG. 8 depicts a perspective view of a drive-removal mechanism and a backplane.
Figure 9:
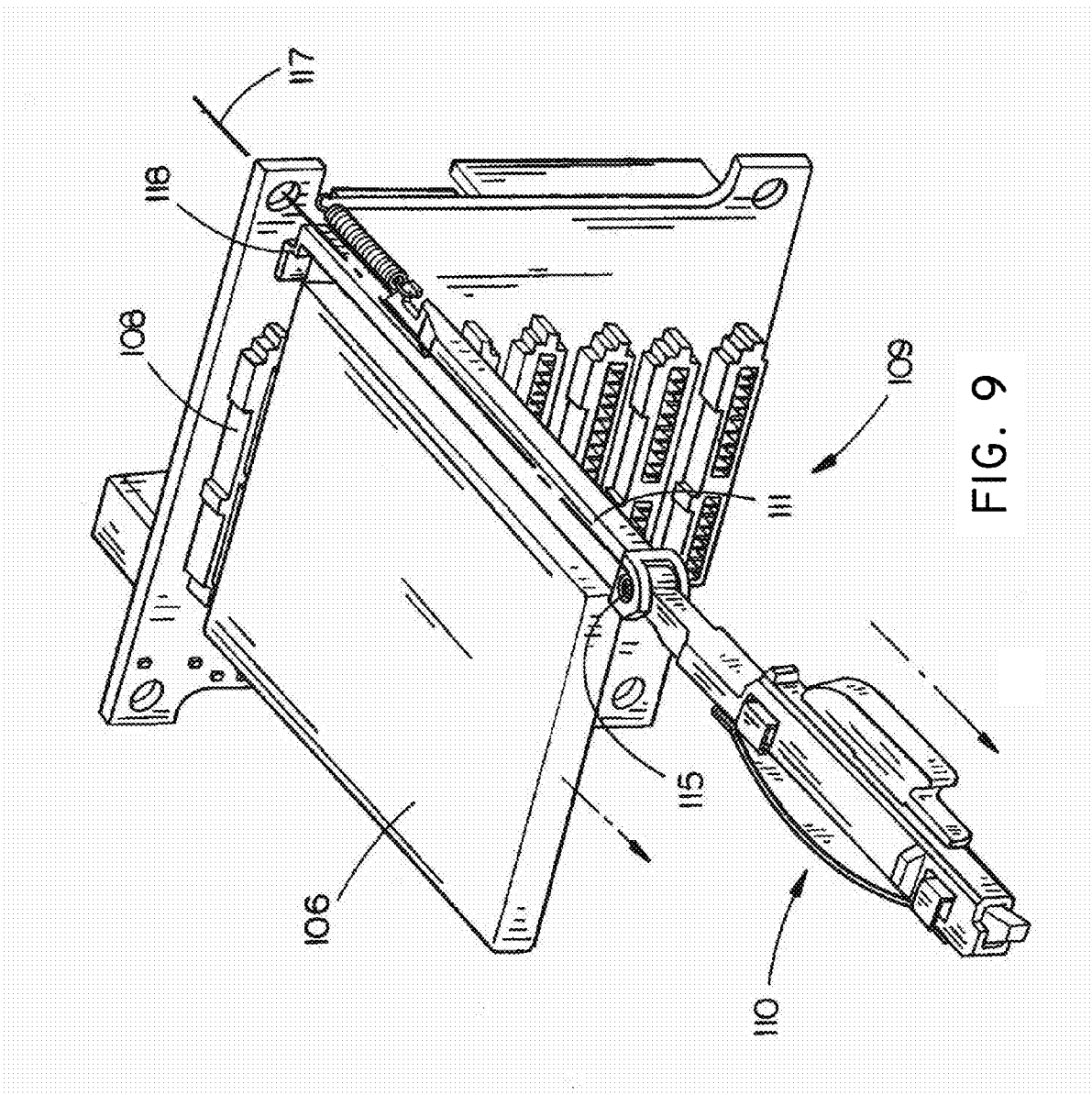
FIG. 9 depicts a perspective view of a drive-removal mechanism and a hot swappable drive coupled to a backplane during removal operations.

Referring to FIGS. 7-9, the rotatable member 110 may be operably coupled to the drive-engaging member 111 via a coupling 115 (e.g. via a pin connector) to create an axis of rotation 116 of the rotatable member 110 about the coupling 115. The rotatable member 110 may be positioned in a drive-locking position where the rotatable member 110 is disposed across an aperture between the drive-receiving member 105A and the drive-receiving member 105B (as shown in FIGS. 7-8) thereby securing a hot swappable drive 106 within the drive bay 101. When the locking mechanism 112 of the rotatable member 110 is in an unlocked position (e.g. the projection 113 is removed from the locking aperture 114 of the drive-receiving member 105B) the rotatable member 110 may be permitted to rotate about the axis of rotation 116. A torsional force may be received by to the rotatable member 110. Upon receipt of a torsional force, the rotatable member 110 may rotate about the axis of rotation 116 to an extent where a primary axis 117A the rotatable member 110 moves into a position substantially parallel to a primary axis 117B of the of a drive-engaging member 111 (e.g. an axis parallel to the longest dimension of the drive-engaging member 111 as depicted in FIGS. 8-9).

Once the rotatable member 110 has been rotated into a position where primary axis 117A of the rotatable member 110 is substantially parallel to the primary axis 117B of a drive-engaging member 111, an axial force in a direction substantially parallel to the primary axis 117B of the drive-engaging member 111 may be received by at least one of the rotatable member 110 and the drive-engaging member 111. Upon receipt of an axial force in a direction substantially parallel to the primary axis 117 of the drive-engaging member 111, the drive-engaging member 111 may be moved from a retracted position to a drive ejection position. For example, when drive-engaging member 111 is in its retracted position and an axial force is applied to at least one of the rotatable member 110 and the drive-engaging member 111 in a direction substantially parallel to the primary axis 117, the drive-engaging member 111 and the rotatable member 110 may move substantially parallel to the primary axis 117 to a point where a drive contacting portion 118 of the drive-engaging member 111 contacts at least a portion of a hot swappable drive 106. Continued axial force in a direction substantially parallel to the primary axis 117 of the drive-engaging member 111 may cause the drive-engaging member 111 to withdraw the hot swappable drive 106 into the drive ejection position, thereby allowing for hand-removal of the hot swappable drive 106 from the drive enclosure 100.

Referring to FIGS. 1 and 8-9, the drive-removal mechanism 109 may further include a spring member 119. The spring member 119 may be operably coupled to the drive-engaging member 111 and a drive cage bracket portion 102. For example, the drive-engaging member 111 and the drive cage bracket portion 102A may include a spring connector 120A and a spring connector 120B, respectively. The spring member 119 may configured such that, when the drive-engaging member 111 is in a drive ejection position, the spring exerts a spring force on the drive-engaging member 111 in a direction at least partially opposite to the direction of movement of the drive-engaging member 111. As such, the spring member 119 may serve to retract the drive-engaging member 111 into its retracted position in the absence of an application of an axial force along the primary axis 117 of the drive-engaging member 111.

Figure 10:
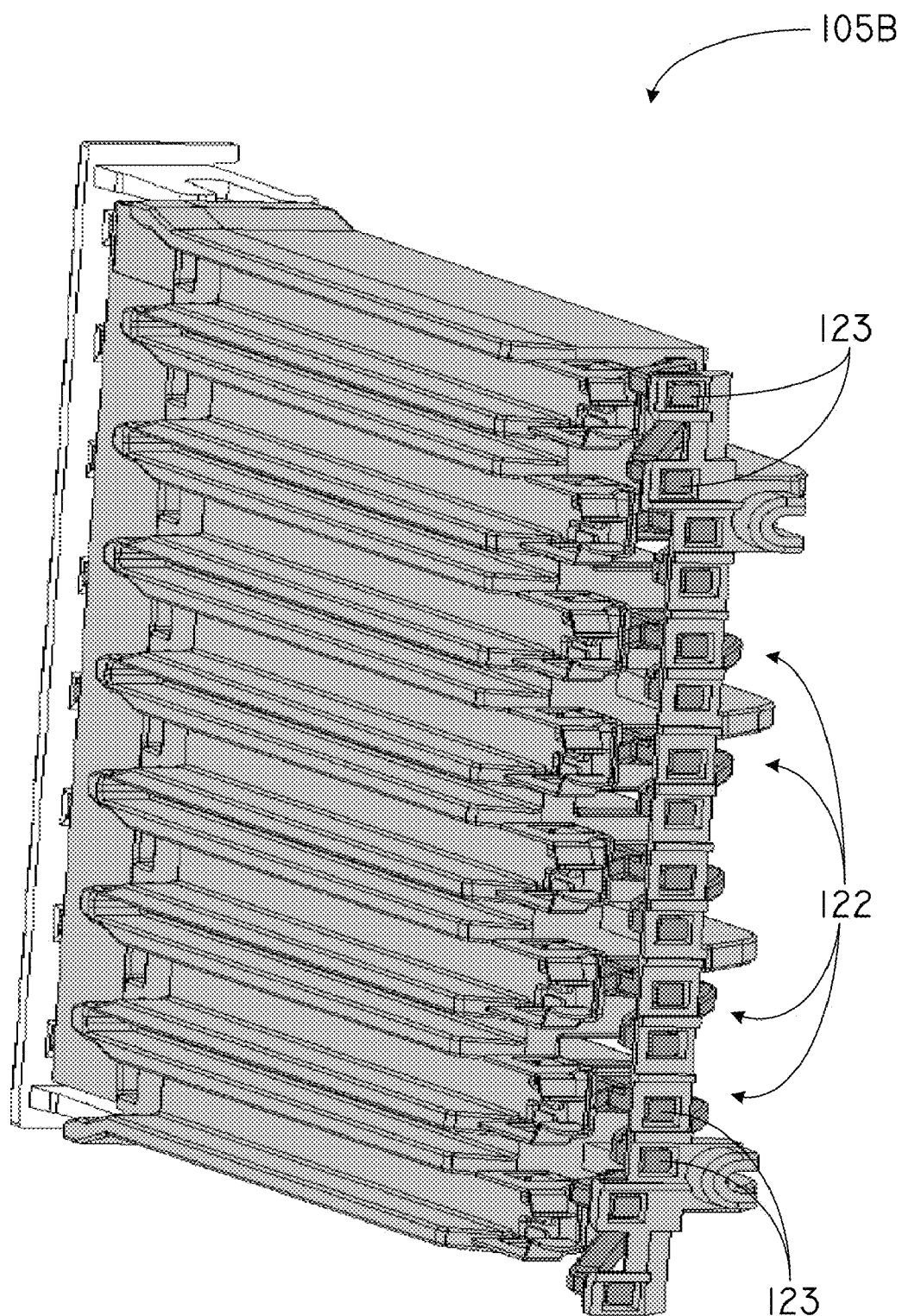
FIG. 10 depicts a perspective view of a drive-receiving member including a light-pipe.
Figure 11:
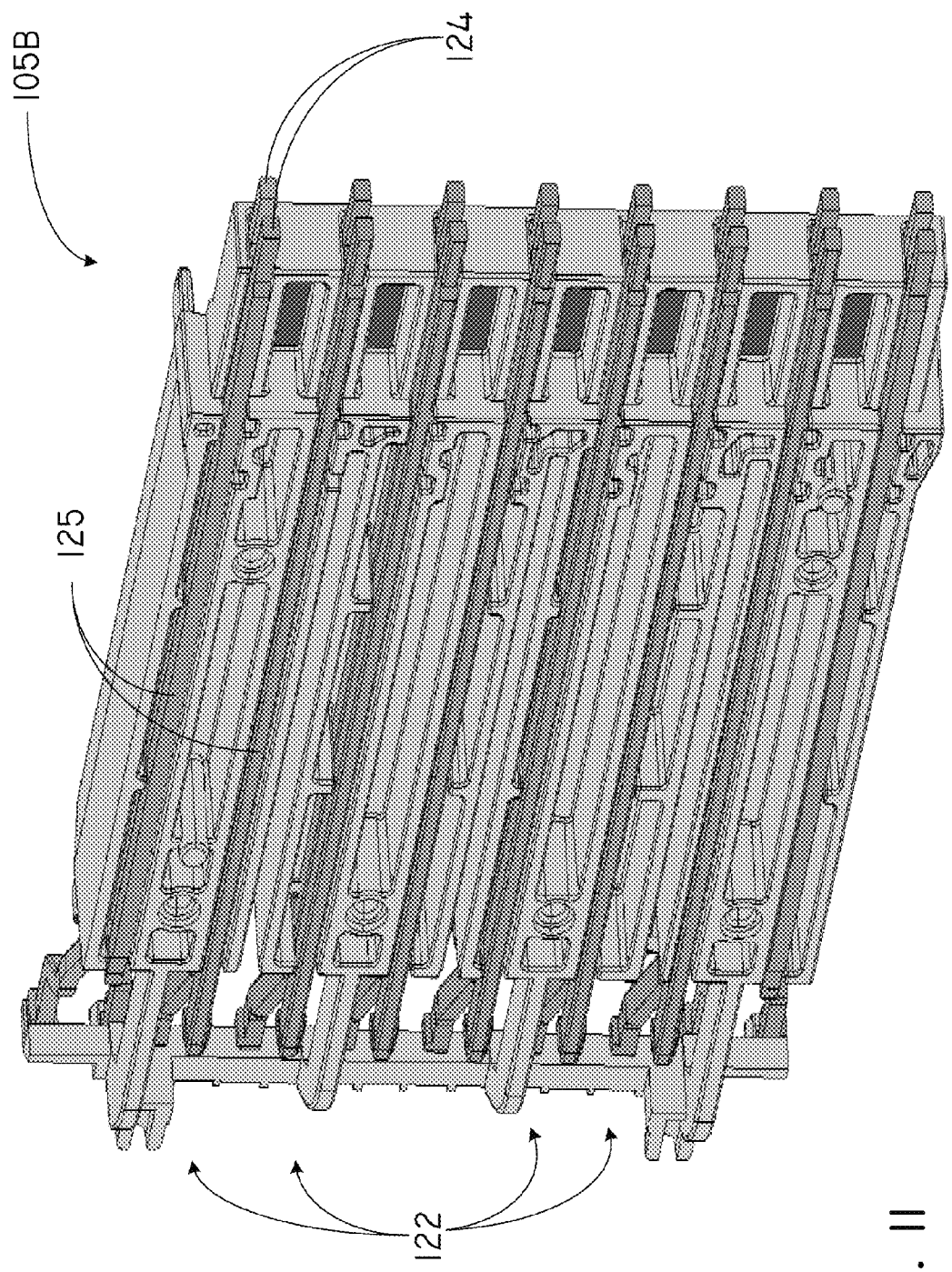
FIG. 11 depicts a perspective view of a drive-receiving member including a light-pipe.

Referring to FIGS. 1 and 10-11, the backplane 104 of the drive enclosure 100 may include at least one light emitting diode 121. The light emitting diode 121 may be a status indicator for providing information about the operations/status of a hot swappable drive disposed within the drive enclosure 100 and coupled to a port 108 of the backplane 104 or information about the operations/status of the backplane 104 itself. The light emitting diode 121 may be disposed on a surface of the backplane 104 where light emitted by the light emitting diode 121 is directed toward the interior of the drive enclosure 100 when the backplane 104 is incorporated into the drive enclosure. In order to provide the light emitted by the light emitting diode 121 to the exterior of the drive enclosure 100, the drive enclosure 100 may include at least one light-pipe 122. The light pipe may include an input surface 123 interior to the drive enclosure 100, an output surface 124 exterior to the drive enclosure and a light conduit 125 configured to transmit light from the input surface 123 to the output surface 124.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A drive-removal mechanism comprising:
    at least one rotatable member; and
    at least one drive-engaging member operably coupled to the at least one rotatable member,
    wherein the drive-removal mechanism is detached from at least one drive to be removed.

2. The drive-removal mechanism of claim 1, wherein the drive-removal mechanism is configured alter a position of a solid state drive.

3. The drive-removal mechanism of claim 1, wherein the at least one drive-engaging member is operably coupled to the at least one rotatable member at a point defining an axis of rotation for the at least one rotatable member.

4. The drive-removal mechanism of claim 1, wherein the at least one rotatable member is rotatable into a position where a primary axis of the at least one rotatable member is substantially parallel to a primary axis of the at least one drive-engaging member.

5. The drive-removal mechanism of claim 1, wherein the at least one drive-engaging member is configured to move substantially parallel to a primary axis of the at least one drive-engaging member between a retracted position and a drive ejection position.

6. The drive-removal mechanism of claim 5, further comprising:
    at least one spring member operably coupled to the at least one drive-engaging member.

7. The drive-removal mechanism of claim 6, wherein the at least one spring member is biased to retain the at least one drive-engaging member in the retracted position.

8. The drive-removal mechanism of claim 6, wherein the at least one spring member is substantially aligned with a primary axis of the at least one drive-engaging member.

9. The drive-removal mechanism of claim 1, wherein the at least one drive-engaging member comprises:
    at least one drive contacting portion.

10. The drive-removal mechanism of claim 9, wherein the drive contacting portion of the drive-engaging member is disposed in a substantially perpendicular position with respect to a primary axis of the at least one drive-engaging member.

11. A drive enclosure comprising:
    at least one drive-receiving member including at least one drive-receiving channel; and
    at least one drive-removal mechanism including:
        at least one rotatable member; and
        at least one drive-engaging member operably coupled to the at least one rotatable member,
    wherein the drive-removal mechanism is configured to at least partially remove at least one hot swappable drive from the at least one drive-receiving channel.

12. The drive enclosure of claim 11, wherein the drive-receiving member further comprises:
    at least one drive-removal mechanism receiving channel.

13. The drive enclosure of claim 12, wherein at least a portion of the at least one drive-engaging member of the at least one drive-removal mechanism is disposed within the at least one drive-removal mechanism receiving channel.

14. The drive enclosure of claim 11, further comprising:
at least one backplane including at least one port configured to couple at least one hot swappable drive to the backplane when the hot swappable drive is disposed within the drive-receiving channel.

15. The drive enclosure of claim 14, wherein the at least one hot swappable drive is a solid-state drive.

16. The drive enclosure of claim 14, wherein the at least one backplane comprises:
at least one indicator light emitting diode.

17. The drive enclosure of claim 11, wherein the at least one drive-engaging member is operably coupled to the at least one rotatable member at a point defining an axis of rotation for the at least one rotatable member.

18. The drive enclosure of claim 17, further comprising:
at least one light-pipe configured to transmit light from the at least one light emitting diode through an exterior surface of the drive enclosure.

19. The drive enclosure of claim 11, wherein the at least one rotatable member is rotatable into a position where a primary axis of the at least one rotatable member is substantially parallel to a primary axis of the at least one drive-engaging member.

20. The drive enclosure of claim 11, wherein the at least one drive-engaging member is configured to move substantially parallel to a primary axis of the at least one drive-engaging member between a retracted position and a drive ejection position.

21. A method for removing a hot swappable drive from a drive enclosure comprising:
receiving an applied force to rotate at least one rotatable member about a coupling with at least one drive-engaging member;
receiving an applied force to move the at least one drive-engaging member in a direction substantially parallel to the primary axis of the at least one drive-engaging member; and
applying a force to at least a portion of at least one hot swappable drive with the at least one drive-engaging member.

22. The method of claim 21, further comprising:
retracting at least the at least one drive-engaging member in a direction substantially parallel to the primary axis of the at least one drive-engaging member via application of a spring-force.

23. The method of claim 21, wherein the applying a force to at least a portion of at least one hot swappable drive with the at least one drive-engaging member comprises:
applying a force to at least a portion of at least one solid-state hot swappable drive with the at least one drive-engaging member.

\* \* \* \* \*